United States Patent [19]

Gamble

[11] Patent Number: 4,627,478
[45] Date of Patent: Dec. 9, 1986

[54] ATTACHMENT FOR A STANDARD POWER PLANER TABLE

[76] Inventor: John E. Gamble, 10 Annette Ave., Smithtown, L.I., N.Y. 11788

[21] Appl. No.: 697,075

[22] Filed: Jan. 31, 1985

[51] Int. Cl.⁴ .............................................. B25H 1/00
[52] U.S. Cl. ................................ 144/287; 144/117 R; 144/253 R
[58] Field of Search ........... 144/253 R, 253 C, 286 R, 144/286 A, 117 R; 144/128

[56] References Cited

U.S. PATENT DOCUMENTS

| | | | |
|---|---|---|---|
| 1,853,442 | 4/1932 | Mann | 144/253 R |
| 2,616,459 | 11/1952 | Johnson | 144/253 R |
| 2,780,255 | 2/1957 | Leonard | 144/253 R |
| 4,196,760 | 4/1980 | McDaniel et al. | 144/253 R |

Primary Examiner—W. D. Bray

[57] ABSTRACT

An attachment for a power planer table to support end up board lumber in which the planer table has a pair of parallel extending handles in a plane parallel to and below the upper surface of the table. According to the invention, a pair of parallel extending rails straddle the handles on opposite sides of the planer table and a pair of parallel extending guides are employed to span the upper surface of the planer table. Attaching members are utilized in cooperation with the guides to support the board lumber end up to facilitate planing of the narrow edge.

1 Claim, 3 Drawing Figures

ATTACHMENT FOR A STANDARD POWER PLANER TABLE

BACKGROUND OF THE INVENTION

Normally, rough sawn lumber is cut to a predetermined rough thickness and width, with the understanding that the thickness will eventually be planed down to a usable size and smooth finish by a power planer. The planer will also make the broad sides of the plank parallel, however, there is no way the narrow sides of the plank can be planed down to a predetermined size, finish and degree of squareness and parallelism. The narrow sides of the plank must be cut down to size and finished by another machine called a "jointer". Planers presently in use rely exclusively on the "jointer" to cut and finish the narrow sides of board lumber to size unless they have the type of attachment which I have designed. The attachment can be retrofitted easily to a planer since nothing must be altered, only added. The use of this "second machine" the "jointer" to plane down the narrow sides of a plank, is the conventional means used to produce finished narrow sides of a predetermined thickness. The jointer, while used to plane down the narrow sides of a plank, does not automatically produce parallel sides, if the narrow sides have not been sawn parallel. The jointer will not necessarily produce parallel sides needed to construct finished items such as furniture without a great deal of skill and effort. The use of the guides will eliminate the extra skill, workmanship and "trial and error" effort required by a jointer operator to insure the production of narrow board sides which are parallel, square, smooth and of a predetermined size.

The following list of patents disclose design features which have nothing in common with my invention. A search was performed, however it appears that the invention is unique, given the advanced state of the art and the ease, simplicity, and feasibility of my invention.

| PATENT | PATENTEE | ISSUE DATE |
| --- | --- | --- |
| 3,951,187 | FINIS LAVELL | 4/24/75 |
| 3,815,687 | EMILE GEORGES PIEMONT | 10/10/72 |
| 3,362,294 | LIEF A HOLAN | 5/9/69 |
| 3,800,360 | BERTON ROXEL | 7/6/64 |

SUMMARY OF THE PRESENT INVENTION

Guides which I have designed are used on a power planer, and used for planing narrow edges of board lumber by keeping the board in an upright position as it is drawn past the planer cutting head which is mounted over the board and planer table. Two guides keep the narrow ends of board lumber in a constant upright position while being planed, allowing narrow edges to be planed parallel. A planer with the attachment I have designed will produce parallel, finished, narrow sides of a board with a predetermined dimension, without the added cost and inconvenience of another machine such as the "jointer".

DETAILED DESCRIPTION OF THE PREFERRED EMBODIMENT

Figure 1:
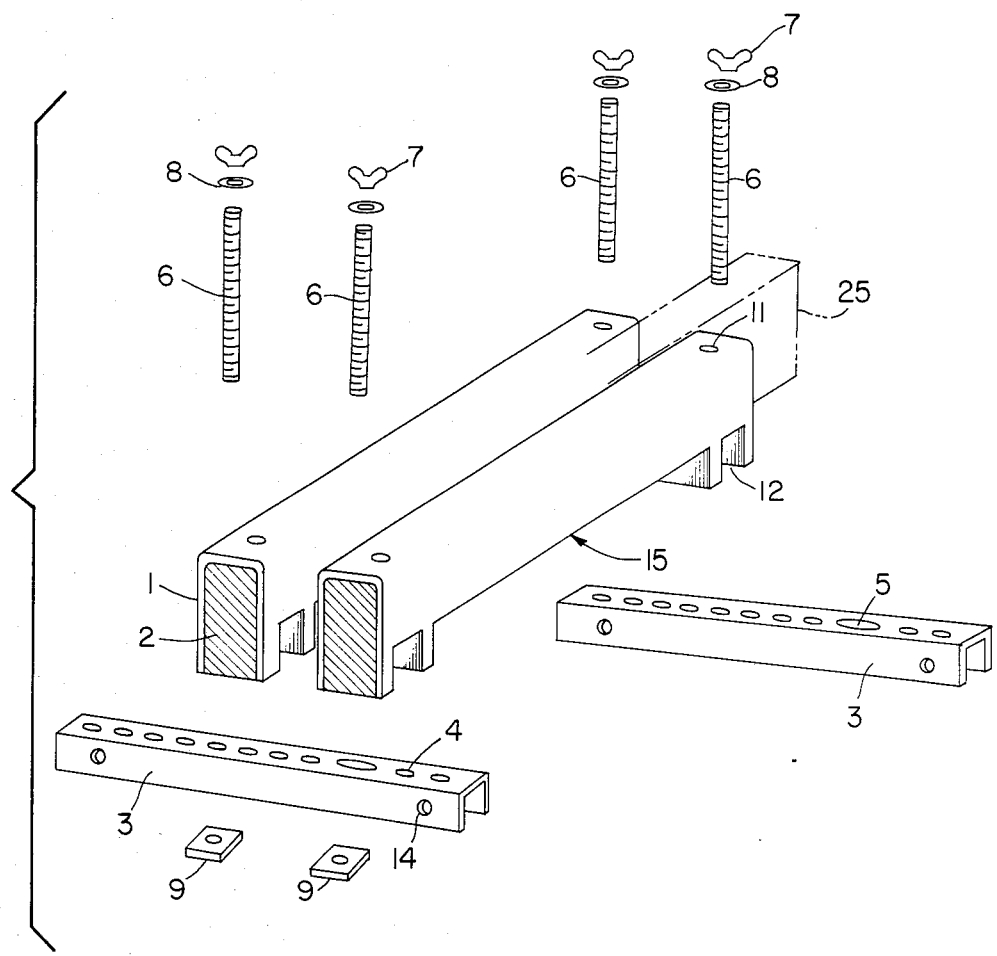
FIG. 1 is an exploded view of a preferred embodiment of this invention not installed.
Figure 2:
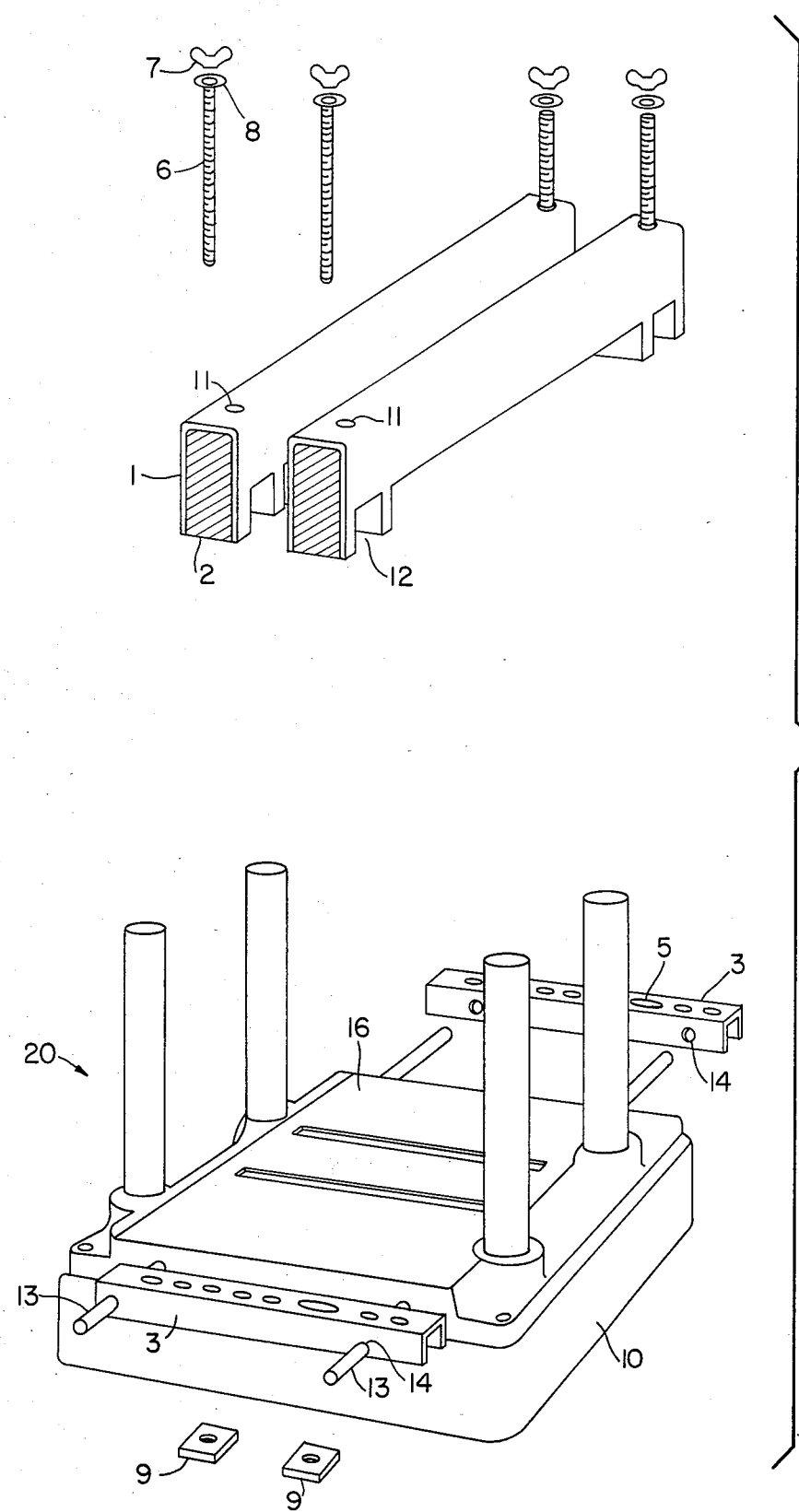
FIG. 2 is an exploded, perspective view of the bottom half of a power planer incorporating the preferred embodiment of this invention.

The following items are shown in FIG. 1: the guides 15 which are made of a sheet metal channel 1, over some core material such as wood 2. The interlock rails 3 shown are made of square, heavy duty steel channel with spacing holes 4, and one hole size slot 5, on the top face of rail 3. The hole 4 and slot 5 are appropriately spaced so as to allow adjustment by lateral movement of the guides 15. The threaded running stock 6, together with a wing nut 7, washer 8, and nut plate 9, combine to fasten each guide 15 at each end to the interlock rail 3, and in turn to the planer table 10 shown in FIG. 2. The threaded bolt 6, enters its hole 11, in the guide 15. The hole 11 is in the center of the guide cutout, 12. Planer handles 13, fit into two aligned holes 14, drilled through both vertical walls of the interlock rail channels 3. The handles 13 are fastened to the planer table 10 of power planer 20 and support rails 3 and guides 15 in the manner illustrated.

Figure 3:
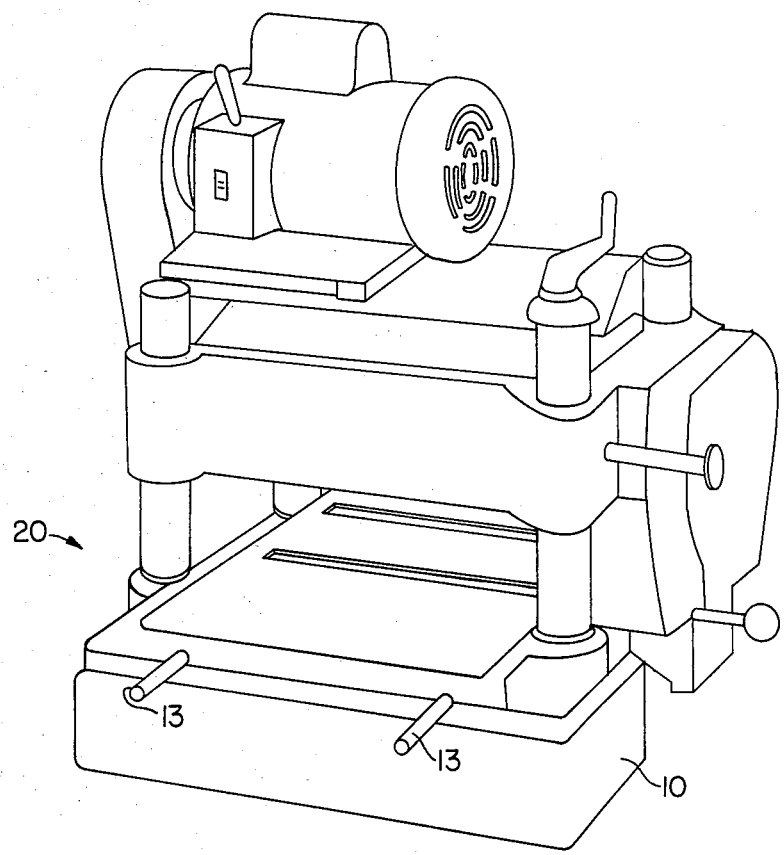
FIG. 3 shows a fully assembled power planer in perspective.

The guides are an attachment which is designed to extend the use for which the ordinary power planer 20, FIG. 3, has been used in the past. This attachment is invented to be fitted to a standard power planer table 10 in power planer 20. As previously described, the attachment consists of two guides 15 approximately seven inches high by three inches wide and long enough to span the planer table 10, and straddle the rails, 3, with its cutouts, 12, at each end. The guides 15 are made of heavy duty sheet metal channel, 1, the outside of which is smooth. The guide core is made of wood, 2. The guides straddle the planer table, 10, and rails 3, in addition to which they also parallel to the table and at right angles to the rails, 3. The guides 15 are held in place by an interlock rail 3 attached at each end of the planer table, 10. The rails 3 are in turn mounted by two holes, 14, each at opposite ends of the rail and which slip over the lifting handles, 13, usually provided as an integral part of the power planer 20 seen in FIG. 3. The handles 13, are mounted parallel to the table. 10, in both the vertical and horizontal axes. The handles, 13, protrude from the planer table, 10. The guides 15 are held secure to the rails 3 and the rails to the (four) handles 13 by threaded stock which enter each end of the guide through a hole at the top of each guide end, FIG. 1, 11. The hole passage extends through the guide 15, FIG. 1 guide slot, 12, the rail, 3, and into the nut plates, 9. The wing nuts, 7, and washers, 8, engage the threaded running stock, 6, from the top horizontal surface of the guide 15 at each end. The lower end of the threaded running stock engages the nut plate, 9, which is positioned on the lower side of the rail 3. The engagement of the wing nut, 7, washer, 8, threaded running stock, 6, and nut plate, 9, should be such as to secure firmly, the guides 15 to the planer table 10, which hold the board lumber perpendicular to the table, allowing the planing of the board lumber narrow edges.

The lumber 25 (shown in phantom) being planed is held in the upright position by guides 15 which are adjusted by loosening the wing nuts, 3, and bolts, 4, (FIG. 1) on both ends of either guide and sliding that particular guide along the interlocking rails, 2, and against the board, then tightening the wing nut, 3, and bolt to secure the guides at each end, so as to keep them from slipping sideways or vertically. The board lumber 25 to be planed is now sandwiched between the two guides 15 as seen in FIG. 1. Once the guides are tightened down with the board 25 in between; the board is then pulled out from in between the guides, at either end of the planer table. The machine is then started, the feed engaged, and the board lumber 25 fed into the planer; narrow edge up and held perpendicular to the table surface by the sides of the guides. The guides will hold a board of lumber between them in an upright position so that the narrow edges of the board are held parallel to the planer table and planer cutter. Holding the narrow edges in this position will cause the narrow edges to be cut accurately, parallel and square without employing a "jointer".

I claim:

1. In a power planer having a planer table to support board lumber having two pair of parallel extending handles in a plane parallel to and below the upper surface of said table, the improvement comprising a pair of parallel extending rails straddling said handles on opposite sites of said planer table, each of said rails having an upper surface with a plurality of spaced openings therethrough, a pair of parallel extending guides mounted at the ends thereof on said rails to span the upper surface of said planer table, each of said guides being notched at each end to fit over and accommodate a rail passing through each notch, a threaded member for each end of said guide to pass through each guide and engage a threaded nut plate under a spaced opening in each rail, and a wing nut for each threaded member to lock each said guide to said rails, thereby securing said guides in place on said planer table, said guides having sufficient height and being properly spaced by the selection of spaced openings in said rails to support a board lumber upright with an edge exposed to permit planing thereof.

* * * * *